(12) United States Patent
Wang

(10) Patent No.: US 7,814,178 B2
(45) Date of Patent: Oct. 12, 2010

(54) METHOD AND APPARATUS FOR DATA CONFIGURATION IN COMMUNICATION DEVICE

(75) Inventor: Yufang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1064 days.

(21) Appl. No.: 10/557,494

(22) PCT Filed: Dec. 31, 2003

(86) PCT No.: PCT/CN03/01163

§ 371 (c)(1),
(2), (4) Date: Sep. 13, 2006

(87) PCT Pub. No.: WO2004/105316

PCT Pub. Date: Dec. 2, 2004

(65) Prior Publication Data

US 2007/0118570 A1 May 24, 2007

(30) Foreign Application Priority Data

May 20, 2003 (CN) .............................. 03 1 23766

(51) Int. Cl.
*G06F 15/177* (2006.01)
(52) U.S. Cl. .................. 709/220; 709/223; 709/250; 707/201; 705/28
(58) Field of Classification Search ............. 709/220, 709/223, 250; 707/201; 705/28
See application file for complete search history.

(56) References Cited

U.S. PATENT DOCUMENTS 6,330,601 B1 * 12/2001 French et al. ............... 709/223

6,389,493 B1   5/2002 Barkley et al.

(Continued)

FOREIGN PATENT DOCUMENTS

CA   2266223   9/2000

(Continued)

OTHER PUBLICATIONS

Koth, A.M. et al., IEEE Africon 4th Stellenbosch, South Africa Sep. 24-27, 1996, New York, NY, USA, IEEE, vol. 2, Sep. 24, 1996, pp. 944-949 "A new interoperable management model for IP and OSI architectures".

*Primary Examiner*—Kyung-Hye Shin
(74) *Attorney, Agent, or Firm*—Conley Rose, P.C.; Grant Rodolph

(57) ABSTRACT

The present invention discloses a method and apparatus for data configuration in a communication device, comprising the following steps of: a) the configuration data centralized unit filtering its internal data, so as to obtain the data to be configured for each configuration data distributed unit; b) the configuration data centralized unit sending said obtained data to each corresponding configuration data distributed unit; c) each configuration data distributed unit making the received data come into effect in it. An apparatus for data configuration of the present invention comprises a configuration data centralized unit and configuration data distributed units, wherein the configuration data centralized unit comprises a filtering sub-module, and one said configuration data distributed unit comprises an adaptation sub-module. During data configuration, the present invention utilizes filtering and adaptation, which leads to little modification to the existing systems and simple and flexible implementation, and significantly reduced redundant data volume for configuration.

18 Claims, 5 Drawing Sheets

U.S. PATENT DOCUMENTS

| | | | |
|---|---|---|---|
| 7,054,924 B1 * | 5/2006 | Harvey et al. | 709/220 |
| 7,363,260 B1 * | 4/2008 | Stamler et al. | 705/28 |
| 2002/0188778 A1 | 12/2002 | Iwanojko et al. | |
| 2003/0069956 A1 * | 4/2003 | Gieseke et al. | 709/223 |
| 2003/0229686 A1 * | 12/2003 | Kortright | 709/220 |

FOREIGN PATENT DOCUMENTS

| | | |
|---|---|---|
| CA | 2281367 | 3/2001 |
| WO | WO01/47207 | 6/2001 |

\* cited by examiner

METHOD AND APPARATUS FOR DATA CONFIGURATION IN COMMUNICATION DEVICE

FIELD OF THE INVENTION

The present invention relates to a method and apparatus for data configuration, in particular to a method and apparatus for data configuration in a communication device.

BACKGROUND OF THE INVENTION

A great deal of data has to be configured for a communication device before the communication device can operate. The data is necessary for startup and normal operation of the communication device; the communication device can operate effectively only when the required data is configured correctly. As the data configured in communication device is complex and huge, the communication device has a high requirement for performance of the configuration database. In order to configure data for a communication device, the configuration data, first, has to be organized in an effective way to support efficient data manipulation (includes addition, deletion, modification, query); in addition, the data configuration shall be real-time, i.e., the change of configuration data shall come into effect and be processed quickly in the entire communication device; furthermore, the rate of occupation of the configuration data in such resources as system memory, CPU, channel, etc. shall be low as far as possible.

Usually, a communication device comprises a plurality of types of functional modules, and different functional modules implement different service functions; in such a communication device, a small distributed database system can be implemented to store, manage, and configure data. Usually, in a communication device, the configuration data system comprises two types of configuration data units: configuration data centralized unit and configuration data distributed unit. Wherein, the configuration data module in the main control module of the communication device is the configuration data centralized unit, which contains all configuration data of the entire device; said data can be obtained through files storing the data in the communication device; the configuration data modules on service modules of the communication device are the configuration data distributed units, which only contain part of the configuration data and obtain required data through the configuration data centralized unit. During the data configuration process, because different functional modules compose a communication device, these functional modules require obviously different configuration data for operation. The data configuration for the same type of functional modules comprises the following two cases: first, each module only cares about its own configuration data and needn't to know configuration data information in the other same type of modules; second, each module needs to know the configuration information in it and the other same type of modules.

Presently, usually the data configuration in a communication device is performed in the second way with the following method: perform configuration according to the types of modules of the communication device; the configuration data in the configuration data distributed units in the same type of modules is identical; in the distributed units, the configuration data is usually accurate down to data table level, i.e., if a data table is defined as existed in one certain type of module, the data table will exist in all the type of modules, and the content of the data table is identical. During startup of service modules in the communication device, the configuration data centralized unit in the main control module distributes all configuration data for this type of the module to the configuration data distributed units of this type of each module; during the data configuration operation (addition, deletion, modification) for any one of this type of modules, synchronization shall be performed for this type of all modules.

When the data is configured in the first way, a great deal of redundant data will occur during module startup and configuration data synchronization, as all the data configuration is performed by module type.

As concluded from the above, the prior art has the following disadvantages:

1. when the configuration is performed by module type during the startup of the communication device, there may be unit-irrelevant redundant configuration data in the configuration data distributed units of the modules due to the different service functions of the modules, which results in waste of device memory; in addition, as redundant data is configured, the time required for distribution of the configuration data during the startup is longer, resulting in low response speed during the startup.

2. Since unit-irrelevant configuration data may be synchronized to the same type of configuration data distributed units of the individual modules during data manipulation, the channels is occupied more, and the configuration data distributed units occupy more CPU capacity and memory, resulting in degraded performance of the entire configuration database system and increased device cost.

3. The data configuration is poor in flexibility. Since the modules in the communication device have different service functions, the configuration data distributed units in each module have different requirements for content of data; in the prior art, the configuration data can only be uniformly distinguished by module type with poor flexibility.

SUMMARY OF THE INVENTION

The object of the present invention is to provide a method and apparatus for data configuration in a communication device, so as to solve the problem of waste of system resources including memory, CPU, etc. resulted from existence of a great deal of redundant data in each distributed unit when the data is configured with the prior art.

To attain the object of the present invention, the present invention provides a method for data configuration in a communication device, said communication device comprising a configuration data centralized unit and configuration data distributed units, said method comprising the following steps of:

a) the configuration data centralized unit filtering its internal data, so as to obtain the data to be configured for each configuration data distributed unit;

b) the configuration data centralized unit sending said obtained data to each corresponding configuration data distributed unit;

c) each configuration data distributed unit making the received data come into effect in it.

An apparatus for data configuration according to the present invention comprises a configuration data centralized unit and configuration data distributed units; said configuration data centralized unit comprising a filtering sub-module 11, which is designed to filter the data in said configuration data centralized unit according to the attributes of data tables reported from each configuration data distributed unit or the attributes of data tables involved in data manipulation, so as to obtain the configuration data to by synchronized to each configuration data distributed unit;

one said configuration data distributed unit comprising an adaptation sub-module 21, which is designed to adapt and convert the data, in the configuration data centralized unit, obtained by the filtering sub-module 11 into the data in the configuration data distributed unit, or to adapt and convert the data in the configuration data distributed unit into the data in the configuration data centralized unit, so that the filtering sub-module 11 performs a corresponding filtering.

Compared with the prior art, the present invention has the following advantages:

1. through filtering the data in the configuration data centralized unit, the present invention can perform selective processing according to the attributes of data tables of modules where the individual distributed units is, i.e., only synchronizing the data required for synchronization of the module, which reduces the data volume for redundant configuration and avoiding waste of memory of the device;

2. since the configuration data volume to be synchronized during startup of the configuration data distributed units is reduced, the starting time of the modules is reduced;

3. since the synchronous procedure from the configuration data centralized unit to the configuration data distributed units reduces the channel occupation, and the configuration data distributed units reduces the memory and CPU resources occupation, the response speed of configuration data in the system is improved, and the saving of system resources including memory, CPU, channel, etc., can reduce the overall device cost to a certain degree;

4. in the present invention, the service modules in the communication device configure data according to their service and functional characteristics, and the attributes of data tables are related with the functional modules instead of unique across the entire device; this configuration enables the data configuration in the entire communication device to be more flexible and efficient in relation to the prior data configuration art.

DETAILED DESCRIPTION OF THE EMBODIMENTS

To facilitate those skilled in the art to understand the present invention better, hereunder the detailed embodiments of the present invention will now be described with reference to the attached drawings.

The present invention takes full advantage of the filtering function of database; during startup of the modules and data manipulation, the present invention constructs a query condition according to the attributes of data tables reported from the configuration data distributed units or the attributes of data tables involved in the data manipulation, and performs data query and filtering in the configuration data centralized unit so as to obtain the configuration data to be configured for each configuration data distributed unit; as the configuration data is only related with each module, redundant data can be reduced significantly.

Figure 1:
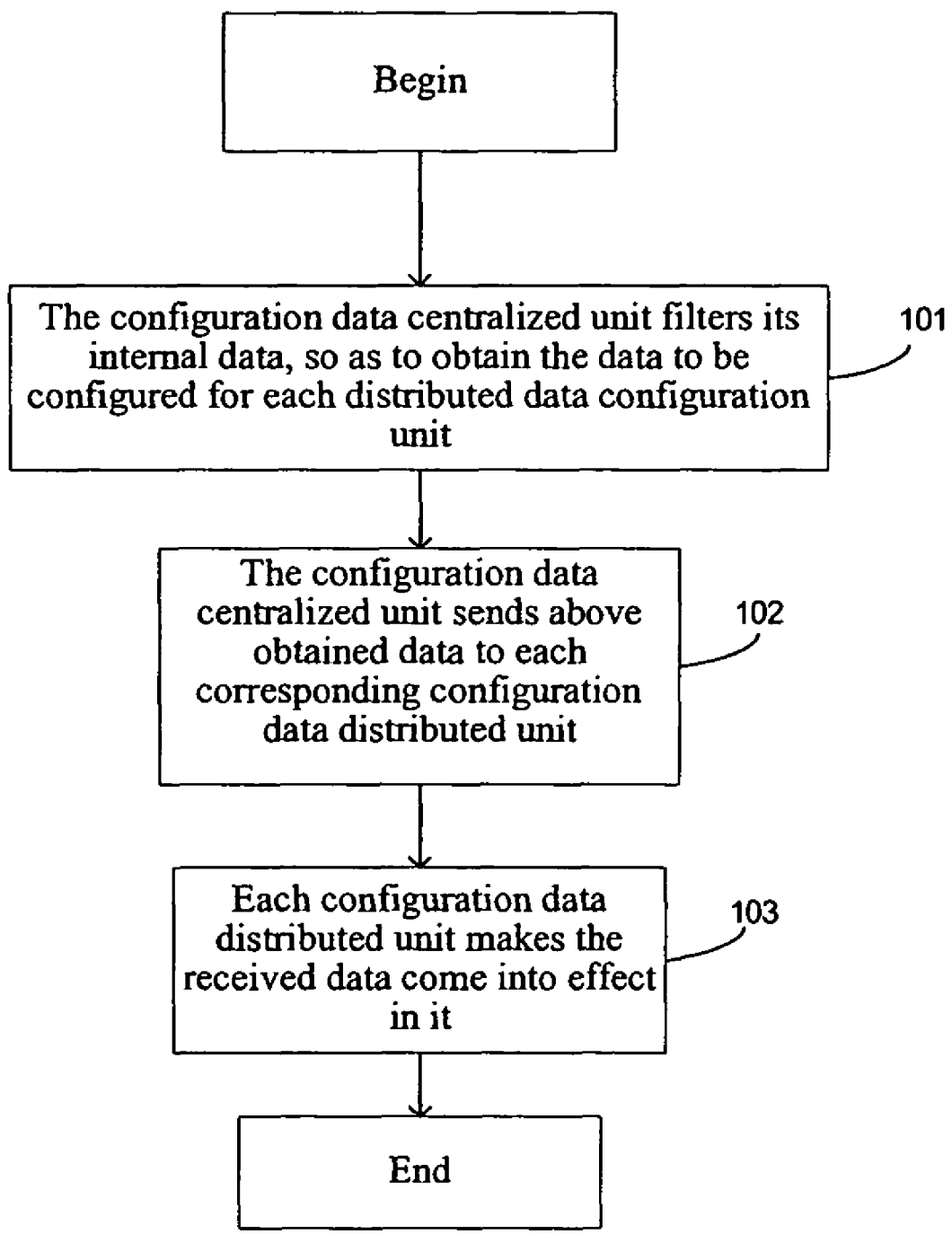
FIG. 1 is a flow diagram of data configuration in the communication device in the present invention.

Particularly, referring to the flow of data configuration in the communication device shown in FIG. 1, the data configuration mainly comprises the following steps of:

101) the configuration data centralized unit filtering its internal data, so as to obtain the data to be configured for each configuration data distributed unit;

102) the configuration data centralized unit sending said obtained data to each corresponding configuration data distributed unit;

103) each configuration data distributed unit making the received data come into effect in the distributed unit, i.e., modifies the corresponding data in it, and finishing the data configuration flow.

Hereunder the process of reducing redundant data through filtering the data in the configuration data centralized unit in the communication device is respectively described in detail in the following cases: a configuration data distributed unit starts up (i.e., a module starts up), the configuration data centralized unit initiates a data manipulation, a configuration data distributed unit initiates a data manipulation.

Figure 2:
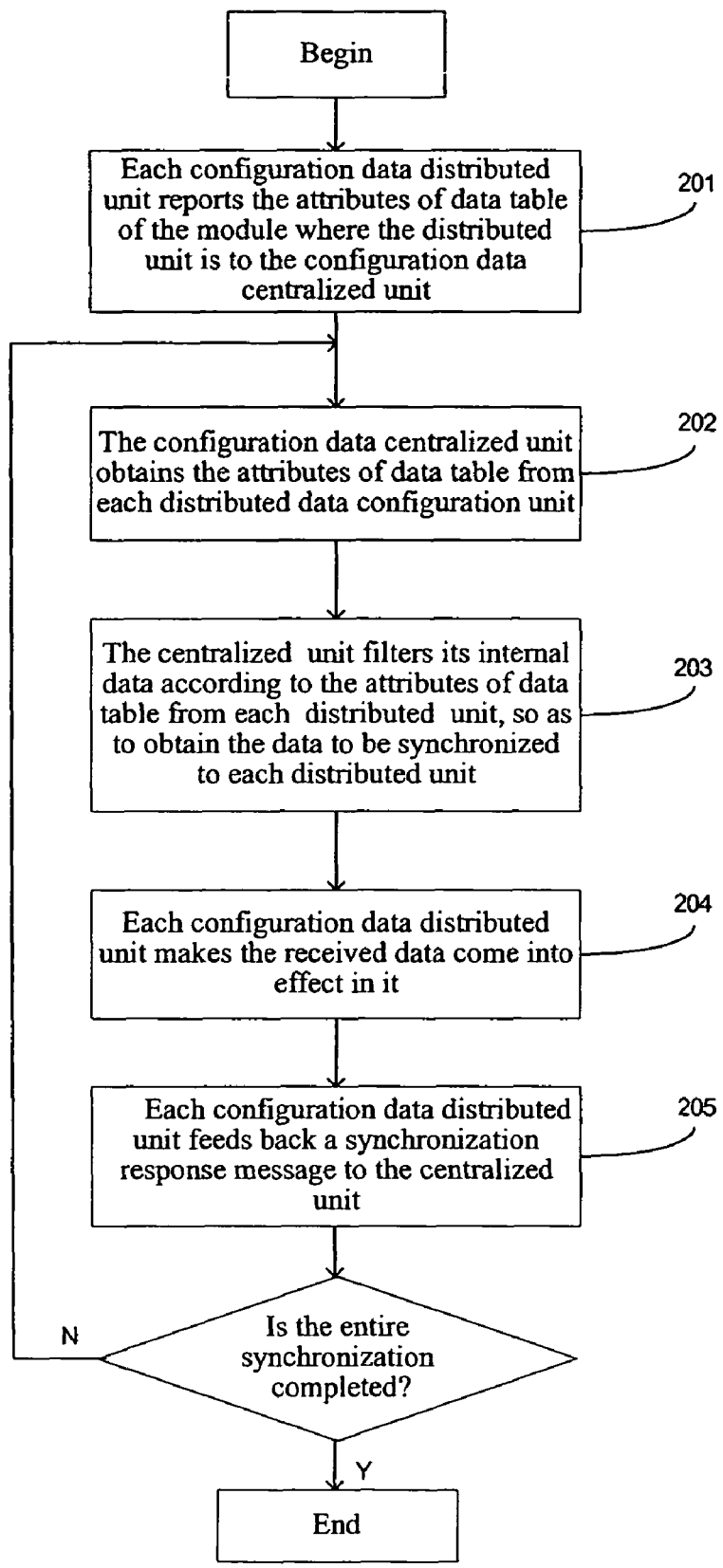
FIG. 2 is a flow diagram of data configuration during startup of a configuration data distributed unit in the present invention.

As shown in FIG. 2, the data configuration process during startup of the configuration data distributed unit particularly comprises the following steps of:

step 201: the module starts up, each configuration data distributed unit reports the attributes of data table of a service module where the distributed unit is to the configuration data centralized unit and requests the centralized unit to synchronize the configuration data according to the reported attributes of data table; here, the attributes of data tables reported from the configuration data distributed units are many, for example, whether the data table employs the first data configuration approach or the second approach for data configuration, i.e., whether the data table contains all records or part of records of the corresponding data table in the configuration data centralized unit; reporting of the attributes of data tables to the centralized unit can be implemented by contrasting a data synchronization request packet and sending the same, which contains the attributes information of data tables, to the configuration data centralized unit.

step 202: the configuration data centralized unit obtains the attributes of data table from each distributed unit. Particularly, after receiving the data synchronization request packet, the configuration data centralized unit records the attributes of configuration data table, in the request packet, reported from the configuration data distributed units, the configuration data centralized unit respectively records the attributes of data table, for each configuration data distributed unit, reported from each configuration data distributed unit, so as to distinguish the data to be synchronized to each module;

step 203: the configuration data centralized unit filters the internal data according to the attributes of data tables, so as to obtain the data to be synchronized to each configuration data distributed unit. Particularly, according to the attributes of data table reported from each configuration data distributed unit, the configuration data centralized unit constructs a query condition combination and utilizes the data query function of the database to filter and produce the configuration data to be synchronized to each configuration data distributed unit; for example, if one said data table contains part of records of the corresponding data table in the configuration data centralized unit, the centralized unit obtains the part of records of data table required for the data configuration of the configuration data distributed unit of the service module, with the type and sequential number ID of the service module corresponding to one said configuration data distributed unit as the query condition; then, the centralized unit constructs a configuration data information packet, fills the configuration data information packet with the records to be processed of each filtered data table in an item by item manner, and sends the packet to the configuration data distributed unit;

step 204: the configuration data distributed units make the received data come into effect in it. Particularly, when the configuration data distributed units receive configuration data information packets containing the data table records to be synchronized, they adapt and convert the data table records contained in said configuration data information packets into the records for each configuration data distributed unit; for example, if the data table contains all records of the corresponding data table in the configuration data centralized unit, the configuration data distributed units extract the content of records of each data table directly from the data packet, and then configure the configuration data distributed units, i.e., modify the corresponding data in each distributed unit, then the data configuration comes into effect; if the data table contains part of records of the corresponding data table in the configuration data centralized unit, the configuration data distributed units first adapt and convert the data table records into records for each configuration data distributed unit; particularly, a data record correspondence table may be pre-established in each configuration data distributed unit; during conversion, a bidirectional data adaptation and conversion between the configuration data centralized unit and each configuration data distributed unit can be performed by searching in the data record correspondence table; here, each configuration data distributed unit adapts and converts the data records of the configuration data centralized unit into data records of each distributed unit by searching in the table, and then modifies the corresponding data in each distributed unit, and records the converted data in each distributed unit to make it come into effect;

step 205: after data configuration, each configuration data distributed unit constructs a synchronization response packet and sends it to the configuration data centralized unit, in order to feed back the synchronization response message.

If the data synchronization in each configuration data distributed unit is not completed, steps 202-205 are repeated to continue the synchronization.

Figure 3:
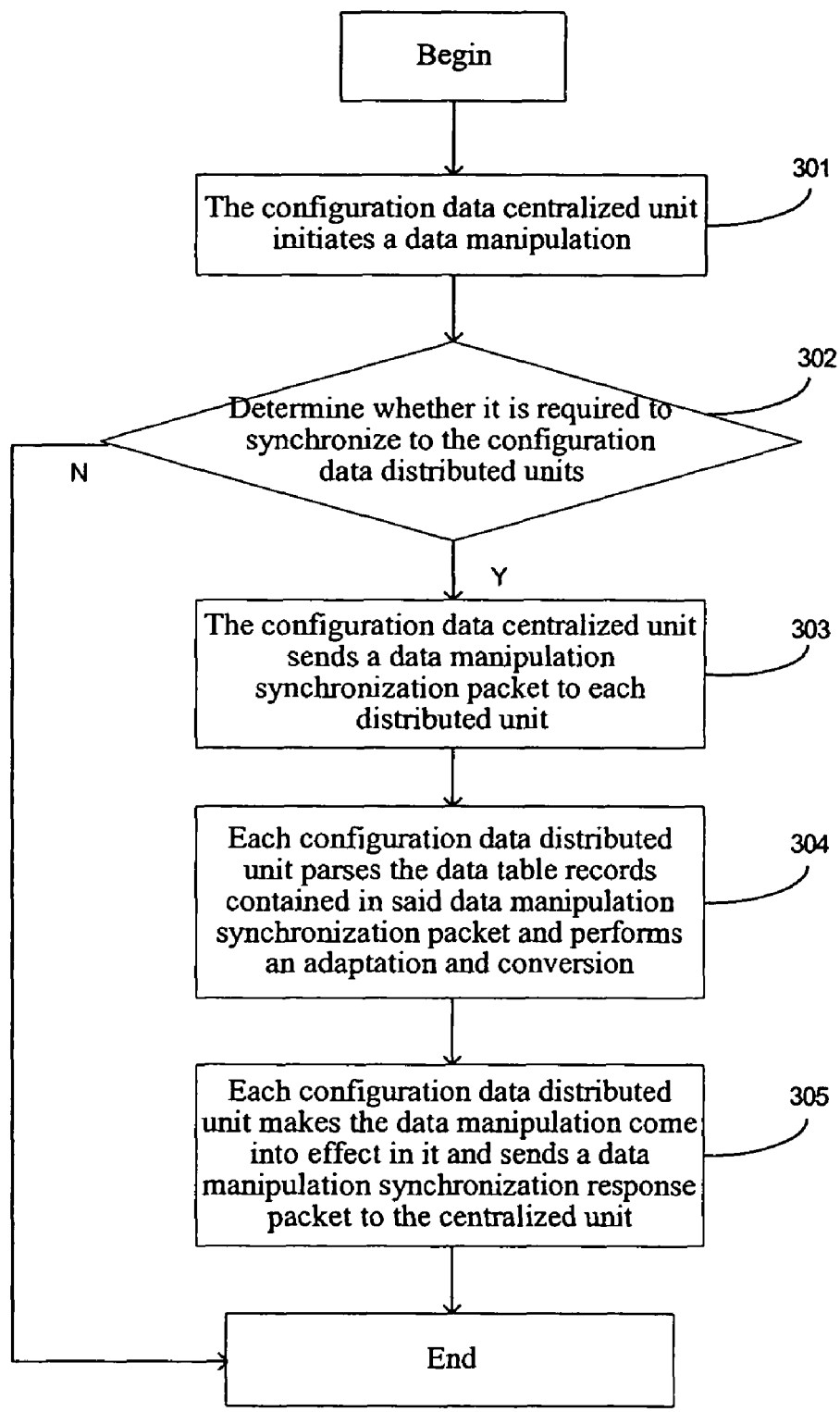
FIG. 3 is a flow diagram of data configuration when the configuration data centralized unit initiates a data manipulation.

As shown in FIG. 3, the data configuration process when the configuration data centralized unit initiates a data manipulation comprises the following steps of:

step 301: the configuration data centralized unit performs the data manipulation (including addition, deletion, modification);

step 302: according to the attributes of data table involved in this data manipulation, the configuration data centralized unit determines whether to synchronize the data manipulation to the configuration data distributed units; if the synchronization is required, the configuration data centralized unit constructs a data manipulation synchronization packet, otherwise it terminates the data manipulation process; particularly, the configuration data centralized unit determines whether to synchronize to the distributed units with the following method: for example, if all records of the data table involved in the data manipulation should be contained in one configuration data distributed unit, the data manipulation should be synchronized to the configuration data distributed unit; if part of records should be contained in the configuration data distributed unit, the configuration data centralized unit will filter the data table records in it, with the type and sequence number ID of the service module corresponding to the configuration data distributed unit as the query condition, and determines whether the records of the data table involved in the data manipulation are distributed in each configuration data distributed unit; if so, synchronization is required; otherwise synchronization is unnecessary;

step 303: the configuration data centralized unit sends a data manipulation synchronization packet to each corresponding configuration data distributed unit; said data manipulation synchronization packet contains the data table records to be synchronized to each configuration data distributed unit;

step 304: when receiving the data manipulation synchronization packet, each configuration data distributed unit obtains the data table records contained in the data manipulation synchronization packet, and then adapts and converts them into data table records for each configuration data distributed unit; here, the adaptation and conversion can also be implemented by searching in the data record correspondence table;

step 305: each configuration data distributed unit makes the data manipulation come into effect in it, and sends a data manipulation synchronization response packet to the configuration data centralized unit.

Figure 4:
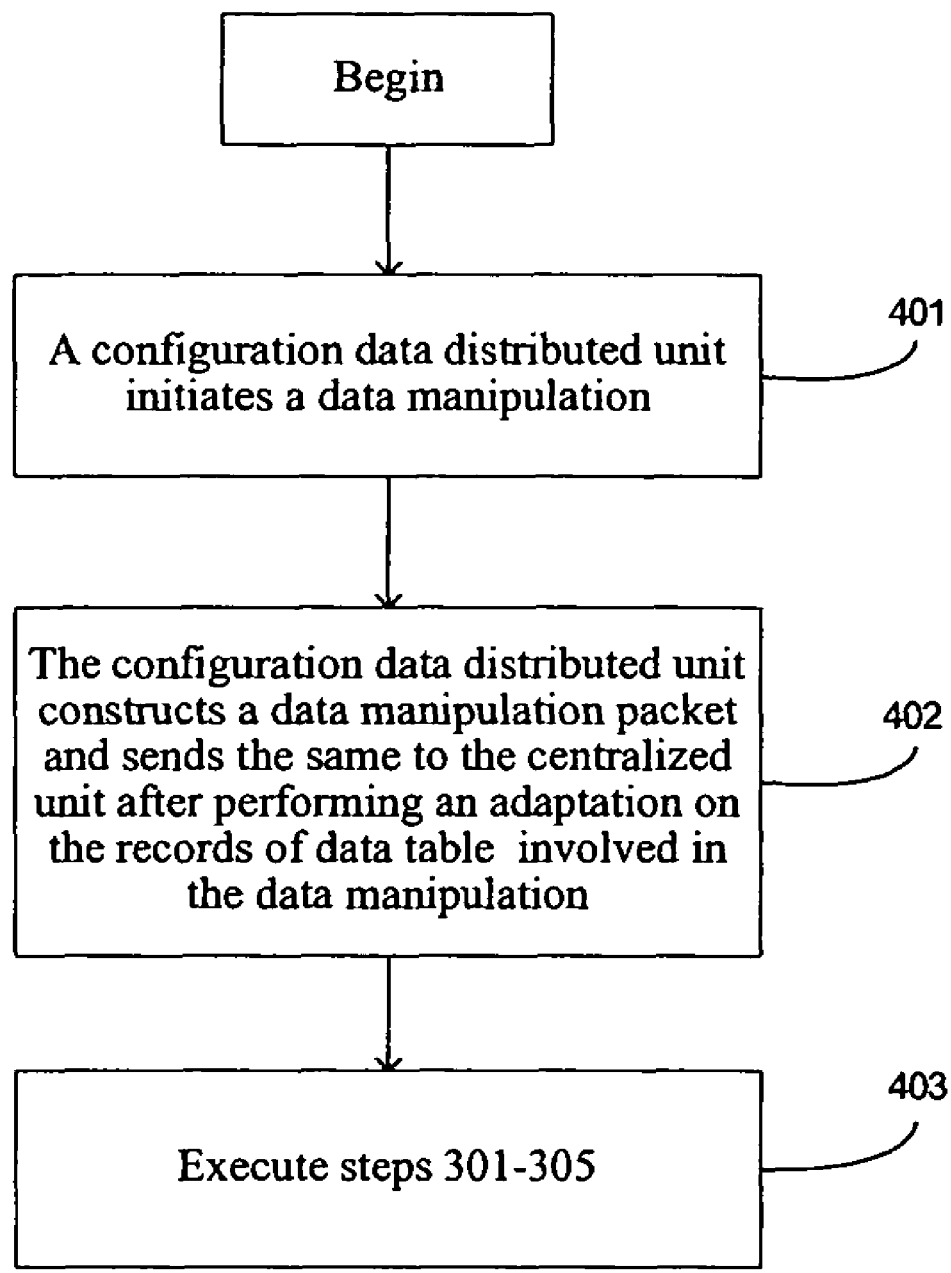
FIG. 4 is a flow diagram of data configuration when a configuration data distributed unit initiates a data manipulation.

Hereunder the data configuration process of the present invention when a configuration data distributed unit initiates a data manipulation will now be described. As shown in FIG. 4, the data configuration process comprises the following steps:

step 401: the configuration data distributed unit performs the data manipulation (including addition, deletion, modification); here, the data manipulation is not brought into effect in the distributed unit; since the configuration data centralized unit contains all data, the configuration data distributed unit should report the data manipulation to the configuration data centralized unit;

step 402: the configuration data distributed unit adapts and converts the records of data table involved in the data manipulation into data table records in the configuration data centralized unit, constructs a data manipulation packet, fills the packet with the adapted and converted records of the data table involved in the data manipulation, and sends the packet to the configuration data centralized unit; particularly, during the adaptation and conversion, if the data table contains all records of the corresponding data table in the configuration data centralized unit, conversion is unnecessary; if the data table contains part of records in the corresponding data table in the configuration data centralized unit, the configuration data distributed unit will first search for the pre-established data record correspondence table, and then adapts and converts the records of the data table, in the distributed unit, involved in the data manipulation into records in the centralized unit upon a successful search, and reports the adapted and converted data to the configuration data centralized unit through the data manipulation packet;

step 403: when receiving the data manipulation packet, the configuration data centralized unit obtains the data from the data manipulation packet and performs the data manipulation; according to the attributes of the data table involved in the data manipulation, the corresponding data configuration process executed by the configuration data centralized unit has the same steps as steps 301~305 of the data configuration process in configuration data centralized unit as shown in FIG. 4. Detailed description is not made any more here.

During the above data configuration, the configuration data centralized unit performs filtering to obtain the data that is only related with the module according to the data query function of database and the attributes of data table of the module where the distributed unit is; during startup, each module obtains the required data from the configuration data centralized unit; during data manipulation (including addition, deletion, modification), it is only required to synchronize the data to involved modules, which can avoid occupation of memory and channels by redundant data during modules startup and data manipulation and improve the data configuration performance. Hereunder the apparatus for data configuration of the present invention is further described.

Figure 5:
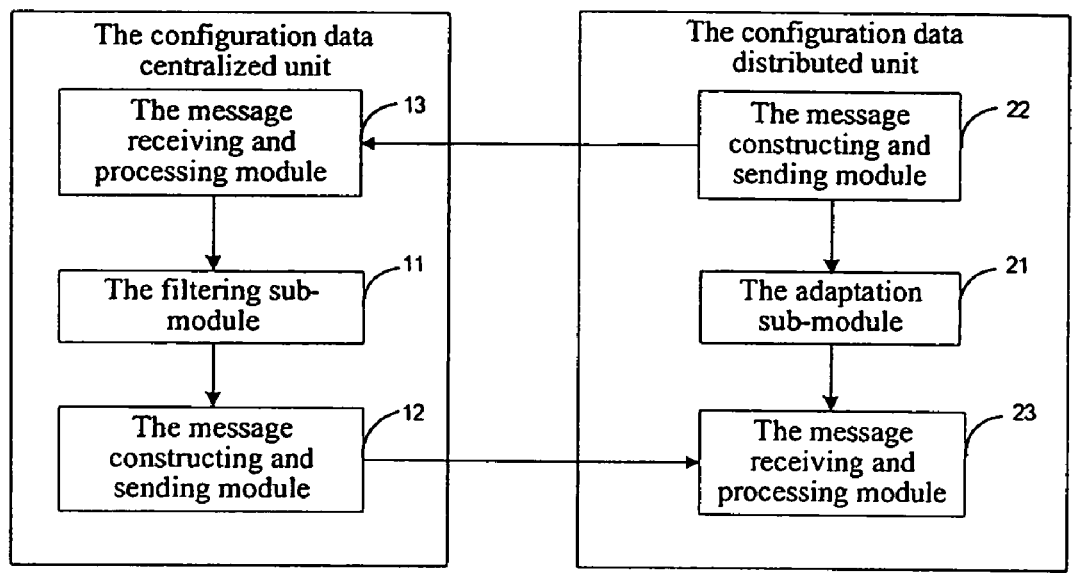
FIG. 5 shows the component modules of the apparatus for data configuration in the present invention.

FIG. 5 shows the component modules of the apparatus for data configuration of the present invention. The apparatus for data configuration of the present invention still comprises a configuration data centralized unit and configuration data distributed units; however, the configuration data centralized unit in the present invention comprises a functional sub-module, i.e., a filtering sub-module 11, which is designed to perform filtering on the data in the configuration data centralized unit according to the attributes of data table reported from each configuration data distributed unit during startup of each service module (i.e., startup of each configuration data distributed unit) or the attributes of data table involved in the data manipulation, so as to obtain configuration data to be synchronized to each configuration data distributed unit; one data table may exist both in the configuration data centralized unit and the distributed units, the configuration data centralized unit contains all data of the data table, while each configuration data distributed unit contains only part of data related with them. Therefore, for the same data records, the physical position and information in the configuration data centralized unit are different from those in the configuration data distributed unit. Thus, in the apparatus for data configuration of the present invention, said configuration data distributed unit comprises another functional sub-module, i.e., an adaptation sub-module 21, which is designed to adapt and convert the data, in the configuration data centralized unit, obtained by the filtering sub-module 11 into the data in each configuration data distributed unit, or to adapt and convert the data in each configuration data distributed unit into the data in the configuration data centralized unit, so that the filtering sub-module 11 can perform the corresponding filtering; for example, during startup of the configuration data distributed units, the filtering sub-module 11 performs filtering to obtain data table records to be configured for each configuration data distributed unit; since the position and information of the data table records in the configuration data centralized unit may be different from those in the configuration data distributed units, the adaptation sub-module 21 is required to adapt and convert said data table records into data table records in each configuration data distributed unit; another case is: when a configuration data distributed unit initiates a data manipulation, the adaptation sub-module 21 is required to adapt and convert the records of data table, in the configuration data distributed unit, involved in the data manipulation into the data table records in the configuration data centralized unit, so that the configuration data centralized unit can obtain attributes of data table involved in data manipulation and then the filtering sub-module 11 performs a corresponding filtering according to the attributes of the data table.

The configuration data centralized unit in the present invention further comprises:

a message constructing and sending module 12, which is designed to construct a data manipulation synchronization packet or a configuration data packet and send the same to the configuration data distributed unit; and a message receiving and processing module 13, which is designed to receive a data synchronization request packet, a data manipulation packet or a synchronization response packet sent from the configuration data distributed unit and perform a corresponding processing;

one said configuration data distributed unit further comprises:

a message constructing and sending module 22, which is designed to construct the data synchronization request packet, the data manipulation packet or the synchronization response packet and send the same to the configuration data centralized unit; and a message receiving and processing module 23, which is designed to receive the data manipulation synchronization packet or the configuration data packet sent from the configuration data centralized unit and perform a corresponding processing.

It is not difficult to understand: due to the above filtering sub-module 11 and adaptation sub-module 21, each configuration data distributed unit can set the configuration data in them according to the requirements for service and function in relation to the service module, so that each of the modules only contains configuration data required for operation of them. The configuration data in each configuration data distributed unit can be accurate to data table record level, i.e., a data table can be distributed in a plurality of modules, but each configuration data distributed unit contains only configuration data records related to the module where each distributed unit is. The difference between the data tables is transparent to each module application.

Particularly, during implementation of the function of the adaptation sub-module 21, a data record correspondence table can be pre-established, said data record correspondence table may be in a bidirectional corresponding storage structure constructed by a chain table or hash table; during data configuration, bidirectional data table records conversion between the configuration data centralized unit and the configuration data distributed units can be performed by searching in said data record correspondence table; the filtering sub-module 11 is implemented by taking full advantage of data query function of application database; it constructs a corresponding query condition combination according to the attributes of data table reported from each configuration data distributed unit or the attributes of data tables involved in data manipulation, searches in and filters the data in the configuration data centralized unit, and produces configuration data records to be synchronized to each configuration data distributed unit; as the data is configured for the modules on demand, the required configuration data volume is significantly reduced during modules startup or data manipulation in relation to the prior art. Furthermore, in relation to the prior art, which configures data by module type, the present invention performs data configuration on up to data table record level; therefore, the data configuration is more flexible.

The above description is only preferred embodiments of the present invention, and cannot construct any limitation to the protected scope of the present invention. Any modification, equivalent substitution or refinement with the spirit and principle of the present invention shall fall into the protected scope of the present invention as defined in the claims.

The invention claimed is:

1. A method for data configuration in a communication device, said communication device comprising a configuration data centralized unit and a plurality of configuration data distributed units, wherein said method comprises the following steps of:

the configuration data centralized unit filtering internal data therein according to attributes of data tables respectively reported by the plurality of configuration data distributed units, so as to obtain data to be configured for corresponding configuration data distributed unit;

the configuration data centralized unit sending said obtained data respectively to the corresponding configuration data distributed unit;

the configuration data distributed unit receiving the obtained data from the configuration data centralized unit, wherein the obtained data contains the data table records to be synchronized;

if the data table contains all records of the corresponding data table in the configuration data centralized unit, the configuration data distributed unit extracting the content of data table records directly from the obtained data, and configuring the configuration data distributed unit; and if the data table contains part of records of the corresponding data table in the configuration data centralized unit, the configuration data distributed unit adapting and converting the data table records into records for the configuration data distributed unit, and making the converted data record into effect.

2. The method for data configuration according to claim 1, wherein during startup of the configuration data distributed units, the configuration data centralized unit filtering internal data therein according to attributes of data tables respectively reported by the plurality of configuration data distributed units comprises the following steps of:

each configuration data distributed unit reporting the attributes of data table of a service module where the configuration data distributed unit is to the configuration data centralized unit;

the configuration data centralized unit filtering its internal data according to the attributes of data table reported from each configuration data distributed unit, so as to obtain the data to be configured for corresponding configuration data distributed unit.

3. The method for data configuration according to claim 1, wherein when the configuration data centralized unit initiates a data manipulation, the configuration data centralized unit filtering internal data therein according to attributes of data tables respectively reported by the plurality of configuration data distributed units comprises the following steps of:

the configuration data centralized unit performing the data manipulation;

the configuration data centralized unit filtering its internal data according to the attributes of data tables involved in the data manipulation, so as to obtain the data to be configured for each corresponding configuration data distributed unit.

4. The method for data configuration according to claim 1, wherein when a configuration data distributed unit initiates a data manipulation, the configuration data centralized unit filtering internal data therein according to attributes of data tables respectively reported by the plurality of configuration data distributed units comprises the following steps of:

the configuration data distributed unit performing the data manipulation;

the configuration data distributed unit adapting and converting the data involved in the data manipulation into the data for the configuration data centralized unit, and then reporting the adapted and converted data to the configuration data centralized unit;

the configuration data centralized unit obtaining the data reported from the configuration data distributed unit, and performing the data manipulation;

the configuration data centralized unit filtering its internal data according to the attributes of data tables involved in the data manipulation, so as to obtain the data to be configured for the corresponding distributed unit.

5. The method for data configuration according to claim 1, further comprising the following step of: sending a response message to the configuration data centralized unit after each configuration data distributed unit completes the data configuration.

6. The method for data configuration according to claim 4, wherein said adaptation and conversion is implemented with the following steps of:

pre-establishing a data record correspondence table;

searching in said data record correspondence table, and performing a bidirectional data conversion between the configuration data centralized unit and each configuration data distributed unit.

7. The method for data configuration according to claim 3, wherein the configuration data centralized unit filtering its internal data according to the attributes of data tables involved in the data manipulation further comprises a step of determining whether to configure data for each distributed unit:

if the data obtained by filtering is distributed in a distributed unit, configuring data for the corresponding distributed unit;

if the data obtained by filtering is not distributed in a distributed unit, not configuring data for the corresponding distributed unit.

8. The method for data configuration according to claim 1, wherein the configuration data distributed unit adapting and converting the data table records into records for the configuration data distributed unit comprise:

pre-establishing a data record correspondence table in the configuration data distributed unit; and the configuration data distributed unit adapting and converting the data table records of the configuration data centralized unit into data records of the distributed unit by searching in the pre-established data record correspondence table.

9. The method for data configuration according to claim 1, wherein the obtained data received by the configuration data distributed unit is the configuration data information packets, which contains the data table records to be synchronized.

10. A method for data configuration in a communication device, said communication device comprising a configuration data centralized unit and a plurality of configuration data distributed units, wherein said method comprises the following steps of:

receiving, by the configuration data centralized unit, attributes of data table reported from each configuration data distributed unit;

filtering, by the configuration data centralized unit, its internal data according to the attributes of data table reported from each configuration data distributed unit, so as to obtain the data to be configured for each corresponding distributed unit;

sending, by the configuration data centralized unit, said obtained data to each corresponding configuration data distributed unit;

receiving, by the configuration data distributed unit, the obtained data from the configuration data centralized unit, wherein the obtained data contains the data table records to be synchronized;

extracting, by the configuration data distributed unit, the content of data table records directly from the obtained data if the data table contains all records of the corresponding data table in the configuration data centralized unit, and configuring the configuration data distributed unit; and adapting and converting, by the configuration data distributed unit, the data table records into records for the configuration data distributed unit if the data table contains part of records of the corresponding data table in the configuration data centralized unit, and making the adapted and converted data into effect.

11. The method for data configuration according to claim 10, wherein the attributes of data table are of a service module where the distributed unit is.

12. The method for data configuration according to claim 10, wherein when the configuration data centralized unit initiates a data manipulation, the method further comprises the following steps of:

performing, by the configuration data centralized unit, the data manipulation; and filtering, by the configuration data centralized unit, its internal data according to the attributes of data tables involved in the data manipulation, so as to obtain the data to be configured for each corresponding configuration data distributed unit.

13. The method for data configuration according to claim 10, wherein when a configuration data distributed unit initiates a data manipulation, the method further comprises the following steps of:

performing, by the configuration data distributed unit, the data manipulation;

adapting and converting, by the configuration data distributed unit, the data involved in the data manipulation into the data for the configuration data centralized unit, and then reporting the adapted and converted data to the configuration data centralized unit;

obtaining, by the configuration data centralized unit, the data reported from the configuration data distributed unit, and performing the data manipulation; and filtering, by the configuration data centralized unit, its internal data according to the attributes of data table involved in the data manipulation, so as to obtain the data to be configured for the corresponding distributed unit.

14. The method for data configuration according to claim 10, wherein adapting and converting, by the configuration data distributed unit, the obtained data into its own data, comprise:

pre-establishing a data record correspondence table in the configuration data distributed unit; and adapting and converting, by the configuration data distributed unit, the data table records of the configuration data centralized unit into data records of the distributed unit by searching in the pre-established data record correspondence table.

15. The method for data configuration according to claim 10, wherein the obtained data received by the configuration data distributed unit is the configuration data information packets, which contains the data table records to be synchronized.

16. An apparatus for data configuration, comprising a configuration data centralized unit and configuration data distributed units;

wherein said configuration data centralized unit comprises a memory configured to store data in the configuration data centralized unit, and a filtering sub-module, which is designed to filter the data in the configuration data centralized unit according to attributes of data tables reported from each configuration data distributed unit or attributes of data tables involved in data manipulation, so as to obtain the configuration data to be synchronized to each corresponding configuration data distributed unit; and wherein one said configuration data distributed unit is configured to report attributes of data tables to the configuration data centralized unit, receive the obtained data from the configuration data centralized unit, wherein the obtained data contains the data table records to be synchronized, and comprises an adaptation sub-module, which is designed to adapt and convert the data table records into records for the configuration data distributed unit if the data table contains part of records of the corresponding data table in the configuration data centralized unit, and making the converted data record into effect; the configuration data distributed unit extracting the content of data table records directly if the obtained data if the data table contains all records of the corresponding data table in the configuration data centralized unit, and configuring the configuration data distributed unit.

17. The apparatus for data configuration according to claim 16, wherein said configuration data centralized unit further comprises:

a message constructing and sending module, which is designed to construct a data manipulation synchronization packet or a configuration data packet and send the same to the configuration data distributed unit; and a message receiving and processing module, which is designed to receive a data synchronization request packet, a data manipulation packet or a synchronization response packet sent from the configuration data distributed unit and perform a corresponding processing;

wherein one said configuration data distributed unit further comprises:

a message constructing and sending module, which is designed to construct the data synchronization request packet, the data manipulation packet or the synchronization response packet and send the same to the configuration data centralized unit; and a message receiving and processing module, which is designed to receive the data manipulation synchronization packet or the configuration data packet sent from the configuration data centralized unit and perform a corresponding processing.

18. The apparatus for data configuration according to claim 16, wherein the obtained data received by the configuration data distributed unit is the configuration data information packets, which contains the data table records to be synchronized.

* * * * *